US008066568B2

(12) United States Patent
O'Kelley, II et al.

(10) Patent No.: US 8,066,568 B2
(45) Date of Patent: Nov. 29, 2011

(54) SYSTEM AND METHOD FOR PROVIDING FEEDBACK ON GAME PLAYERS AND ENHANCING SOCIAL MATCHMAKING

(75) Inventors: Patrick W. O'Kelley, II, Seattle, WA (US); Steven D. Lamb, Woodinville, WA (US); Michal Bortnik, Seattle, WA (US); Johan Peter Hansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1350 days.

(21) Appl. No.: 11/110,017

(22) Filed: Apr. 19, 2005

(65) Prior Publication Data

US 2006/0247055 A1 Nov. 2, 2006

(51) Int. Cl.
*A63F 13/00* (2006.01)
(52) U.S. Cl. ............... 463/42; 463/40; 463/41; 705/10
(58) Field of Classification Search .............. 463/1–45
See application file for complete search history.

(56) References Cited

U.S. PATENT DOCUMENTS

| | | | |
|---|---|---|---|
| 5,586,257 A | 12/1996 | Perlman | |
| 5,813,913 A | 9/1998 | Berner et al. | |
| 6,106,399 A | 8/2000 | Baker et al. | |
| 6,128,660 A | 10/2000 | Grimm et al. | |
| 6,322,451 B1 * | 11/2001 | Miura | 463/42 |
| 6,352,479 B1 * | 3/2002 | Sparks, II | 463/42 |
| 6,425,828 B2 | 7/2002 | Walker et al. | |
| 6,460,036 B1 | 10/2002 | Herz | |
| 6,487,583 B1 | 11/2002 | Harvey et al. | |
| 6,641,481 B1 * | 11/2003 | Mai et al. | 463/42 |
| 6,648,760 B1 | 11/2003 | Nicastro | |
| 6,817,947 B2 | 11/2004 | Tanskanen | |
| 6,821,205 B2 * | 11/2004 | Takahashi et al. | 463/42 |
| 7,029,394 B2 | 4/2006 | Leen et al. | |
| 7,056,217 B1 | 6/2006 | Pelkey et al. | |
| 7,069,308 B2 | 6/2006 | Abrams | 709/218 |
| 7,086,946 B2 | 8/2006 | Yoshida | |
| 7,530,895 B2 | 5/2009 | Kigoshi | |
| 7,614,955 B2 | 11/2009 | Farnham et al. | |
| 2001/0004609 A1 * | 6/2001 | Walker et al. | 463/42 |
| 2001/0044339 A1 | 11/2001 | Cordero et al. | |
| 2002/0147645 A1 | 10/2002 | Alao et al. | 725/32 |
| 2003/0064807 A1 | 4/2003 | Walker et al. | |

(Continued)

FOREIGN PATENT DOCUMENTS

KR 2001-0091478 A 10/2001

(Continued)

OTHER PUBLICATIONS

"Feedback Forum" from eBay, Feb. 2, 2004, <http://web.archive.org/web/20040202054149/http://pages.ebay.com/services/forum/feedback.html>.*

(Continued)

*Primary Examiner* — Ronald Laneau
*Assistant Examiner* — Justin Myhr
(74) *Attorney, Agent, or Firm* — Woodcock Washburn LLP

(57) ABSTRACT

A service that receives feedback from players in a game playing service. The service provides an aggregation of the feedback so that a reputation score can be determined by various players in the system. The service takes into account direct feedback from other players about positive and negative experiences with a particular player and expectations about appropriate conduct and type of game being played before a player joins the game session.

20 Claims, 13 Drawing Sheets

U.S. PATENT DOCUMENTS

| | | | |
|---|---|---|---|
| 2003/0093168 A1 | 5/2003 | Nagaoka | |
| 2003/0126613 A1 | 7/2003 | McGuire | |
| 2003/0216183 A1* | 11/2003 | Danieli et al. | 463/42 |
| 2003/0216962 A1 | 11/2003 | Heller et al. | |
| 2003/0237087 A1* | 12/2003 | Kurapati et al. | 725/9 |
| 2004/0097287 A1 | 5/2004 | Postrel | |
| 2004/0143852 A1 | 7/2004 | Meyers | |
| 2004/0192440 A1* | 9/2004 | Evans et al. | 463/30 |
| 2005/0021750 A1* | 1/2005 | Abrams | 709/225 |
| 2005/0181877 A1 | 8/2005 | Kuwahara et al. | |
| 2005/0192097 A1 | 9/2005 | Farnham et al. | |
| 2005/0209002 A1* | 9/2005 | Blythe et al. | 463/42 |
| 2005/0251399 A1 | 11/2005 | Agarwal et al. | |
| 2006/0073882 A1 | 4/2006 | Rozkin et al. | |
| 2006/0121990 A1 | 6/2006 | O'Kelley et al. | |
| 2006/0135264 A1 | 6/2006 | Shaw et al. | |
| 2006/0247055 A1 | 11/2006 | O'Kelley et al. | |
| 2006/0287096 A1 | 12/2006 | O'Kelley et al. | |
| 2006/0287099 A1 | 12/2006 | Shaw et al. | |

FOREIGN PATENT DOCUMENTS

| | | |
|---|---|---|
| RU | 2102790 C1 | 1/1998 |
| WO | WO 2006/113809 | 10/2006 |
| WO | WO 2007/001628 | 1/2007 |

OTHER PUBLICATIONS

"Terra Nova Reputation", Terra Nova Blog, pp. 13 and 16-18, <http://terranova.blogs.com/terra_nova/2003/12/reputation.html>.*

Microsoft Case Study, "Innovative online gameplay community serves up 4 million pages per day", http://tech.msn.com/guides/1199615.armx, 2005, pp. 1-7.

"Quake," Wikipedia, The Free Encyclopedia, Feb. 22, 2009, <http://en.wikipedia.org/w/index.php?title=Client-side_Quake&oldid=272432231>.

"Client-side Prediction," Wikipedia, The Free Encyclopedia, Feb. 3, 2009, <http://en.wikipedia.org/w/index.php?title=Client-side_prediction&oldid=268359201>.

"Unreal Networking Architecture," Epic MegaGames, Inc., Jul. 21, 1999, <http://unreal.epicgames.com/network.htm>.

United States Patent and Trademark Office: Non-Final Office Action dated Oct. 1, 2008, U.S. Appl. No. 11/007,893.

United States Patent and Trademark Office: Restriction Requirement dated Oct. 7, 2009, U.S. Appl. No. 11/312,781.

United States Patent and Trademark Office: Non-Final Office Action dated Oct. 13, 2009, U.S. Appl. No. 11/313,103.

United States Patent and Trademark Office: Non-Final Office Action dated Nov. 1, 2007, U.S. Appl. No. 11/156,877.

United States Patent and Trademark Office: Final Office Action dated Jul. 9, 2008, U.S. Appl. No. 11/156,877.

United States Patent and Trademark Office: Non-Final Office Action dated Mar. 9, 2009, U.S. Appl. No. 11/156,877.

United States Patent and Trademark Office: Final Office Action dated Nov. 6, 2009, U.S. Appl. No. 11/156,877.

United States Patent and Trademark Office: Non-Final Office Action dated Dec. 11, 2007, U.S. Appl. No. 11/312,959.

United States Patent and Trademark Office: Final Office Action dated Sep. 30, 2008, U.S. Appl. No. 11/312,959.

United States Patent and Trademark Office: Non-Final Office Action dated May 27, 2009, U.S. Appl. No. 11/312,959.

U.S. Appl. No. 11/313,103, filed Dec. 20, 2005, Shaw et al.

PCT International Preliminary Report on Patentability issued Oct. 23, 2007, in corresponding International Application No. PCT/US2006/014750.

PCT International Search Report mailed Sep. 27, 2007, in corresponding International Application No. PCT/US2006/014750.

Supplementary European Search Report dated Dec. 3, 2008, in corresponding EP Application No. EP06750723.6.

PCT International Preliminary Report on Patentability issued Dec. 24, 2007, in corresponding International Application No. PCT/US2006/017307.

PCT International Search Report mailed Jul. 30, 2007, in corresponding International Application No. PCT/US2006/017307.

United States Patent and Trademark Office: Final Office Action dated Feb. 2, 2010, U.S. Appl. No. 11/312,959.

United States Patent and Trademark Office: Notice of Allowance dated Dec. 3, 2009, U.S. Appl. No. 11/007,893.

Xiong et al., "A Reputation-Based Trust Model for Peer-to-Peer eCommerce Communities", (no month available), 2003, 12 pages.

Heeter, "BattleTech Masters: Emergence of the First U.S. Virtual Reality SubCulture", Multimedia Review, Jan. 1-9, 1993.

* cited by examiner

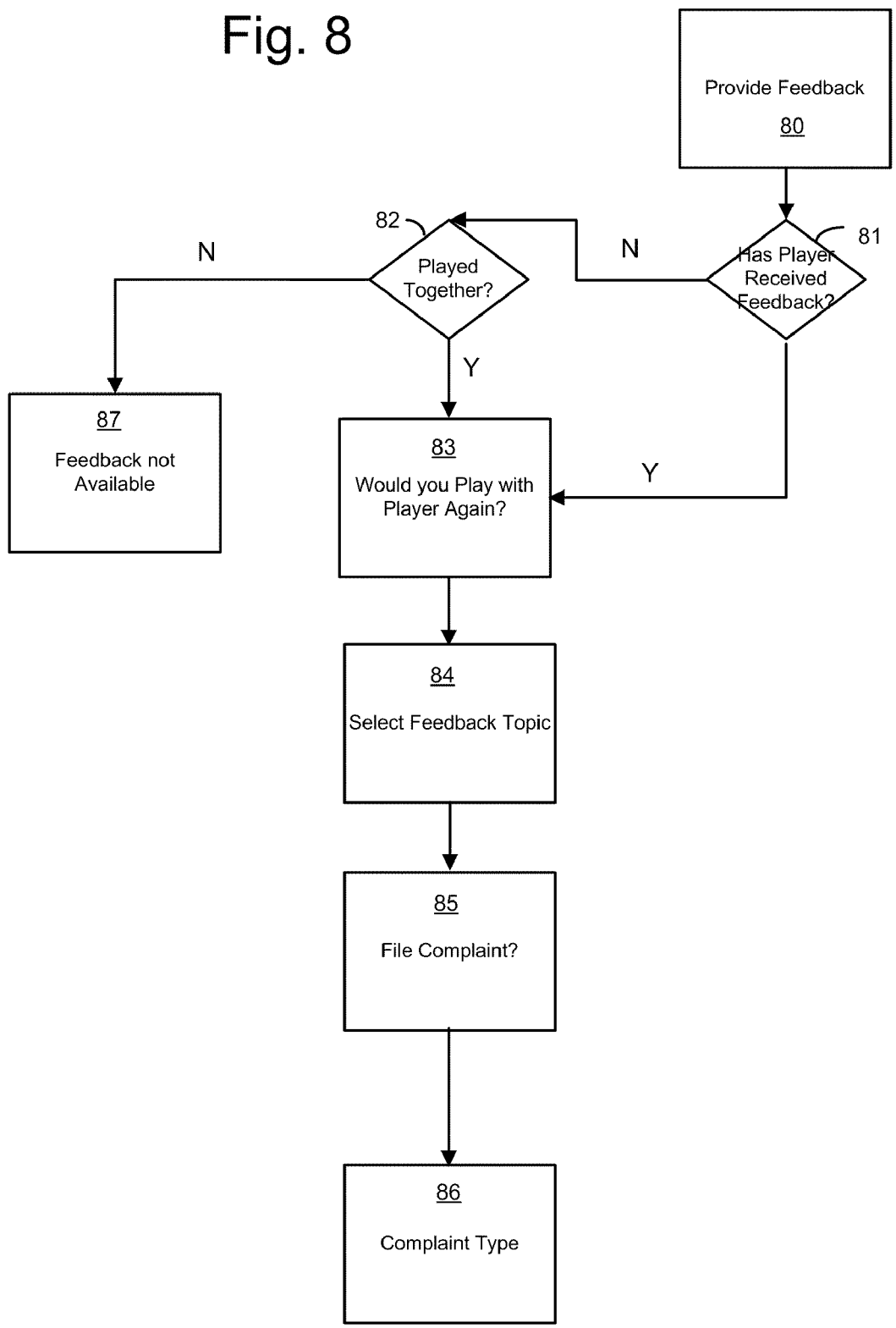

1332

SYSTEM AND METHOD FOR PROVIDING FEEDBACK ON GAME PLAYERS AND ENHANCING SOCIAL MATCHMAKING

FIELD OF THE INVENTION

This invention generally relates to the field of gaming and multimedia devices. In particular, the present invention is directed to a method of providing information to a service regarding player behavior in an on-line gaming environment.

BACKGROUND OF THE INVENTION

In online gaming, game hosting services and game developers have created a number of ways to track and personalize the online gaming experience. One drawback of existing systems is that many of the features have grown up independent of each other. Games send blobs of data about gamers back and forth to a central service, but the service has no way to understand and aggregate the data outside of the game context. Games can host their own Websites, but the data displayed there is not universally accessible to other games.

In a sense, then, the service and games offer two parallel communities that offer great—but separated—resources for gamers. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available.

Second, in the service community, the service knows a gamer player's history, all of the games he's played, the amount of time he spends online, the size of his Friends list and all of the games that Friends have played or are playing, the Friends invites sent and received, the Messages sent and received, and all of the Feedback the gamer has given and received.

Systems have tried to leverage these on-line communities to match various players to allow them to play multi-player games. Nevertheless, in general such systems, which typically emphasize skill or experience in a single game or small family of games, do not group players who are likely to enjoy shared interaction based on social and/or personal considerations. That's because these social factors, which depend on large aggregates of data across many game types and session, cannot easily be taken into account when matching players for a single game. Matchmaking systems in the gaming world do not produce close relationships between individual players.

There is a need for a matchmaking service that selects matches based on personal/social characteristics that emerge from cross-game data collection. Moreover, such systems should take into account direct feedback from other players about positive and negative experiences with a particular player and expectations about appropriate conduct and type of game being played before a player joins the game session. Such a system, it is believed, will result in deeper interpersonal relationships and more enjoyable game play, because the frequency and quality of interaction with suitable players is increased over time as a player's network of familiar players grows.

SUMMARY OF THE INVENTION

The invention comprises systems and methods for playing a multi-player computer-based game. A database having a plurality of user profiles is maintained by a service. The user profiles comprise a plurality of attributes of a plurality of users (or game players). The service is capable of receiving input from a select one of the plurality of users. The input is feedback about the reputation of other ones of the plurality of users. The service then maintains an aggregation of feedback for the plurality of users and an indication of the aggregation is capable of being read by the other of the plurality of users. The aggregation may be aggregated over a plurality of different games titles from variety of different game developers and distributors. The indication of feedback may comprises an indication of the number of positive or negative reviews that a player received. In that way, users of the system can quickly assess the reputation of a game player in the broader gaming community.

The service may also maintain selected ones of the plurality of users in an affiliate list for the select one of said plurality of users when that user provides positive or negative feedback. The affiliate list stores the relational information between each pair of users who have given positive or negative feedback on each other. The service is preferably maintained on a server and the plurality of users connect to the service over a network connection. More preferably, the plurality of users connect to the server by way of a game console. And the game console may locally execute at least a portion of the multi-player game. In the matchmaking of players for multi-player games, the service uses the affiliate list to prefer to put together players who have given positive feedback on each other. Additionally, in the matchmaking of players for multi-player games the service uses the affiliate list to avoid putting together players where one or both has given negative feedback on the other.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 8 illustrates a flow diagram for providing feedback on game players;

DETAILED DESCRIPTION OF THE INVENTION

Figure 1:
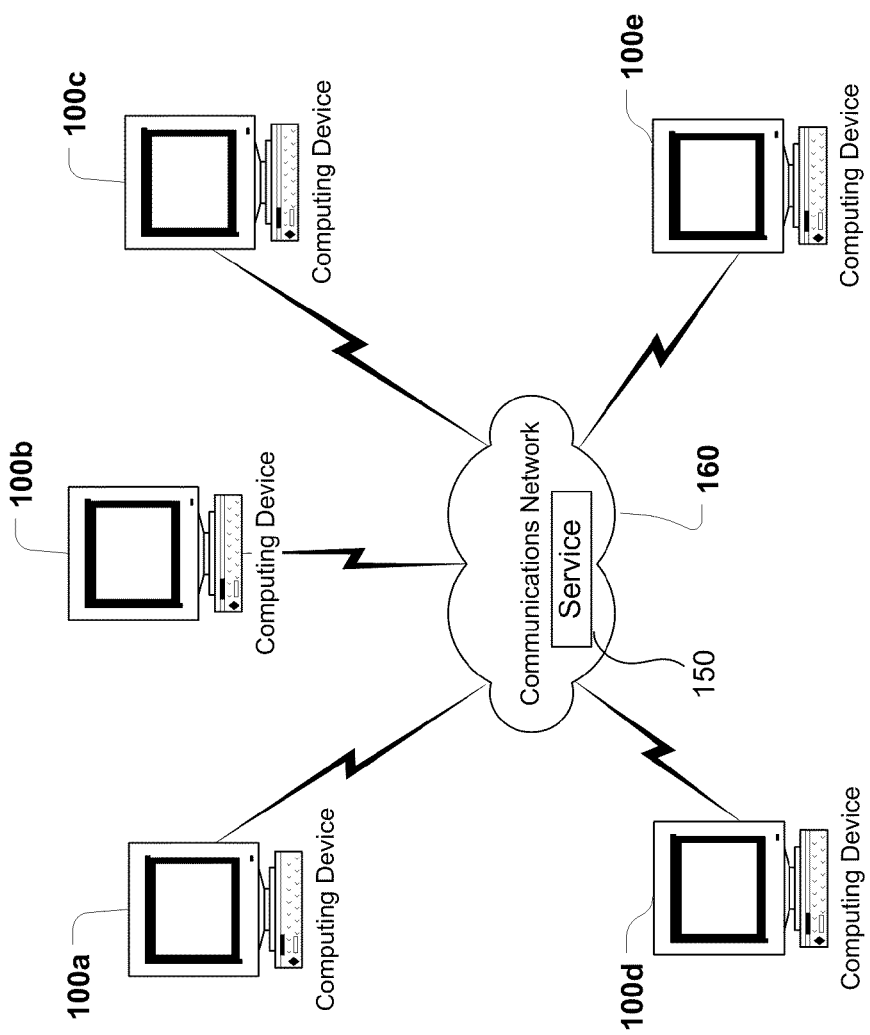
FIG. 1 is a block diagram of an exemplary computer network environment in which aspects of the present invention may be implemented.

FIG. 1 is diagram of an exemplary computer network that serves to illustrate aspects of the invention. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There is a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the present invention could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections. Additionally, the computer network may comprises a distributed computing environment. In such an environment a computing task may be spread over a number of computing devices that are addressable elements in a computer network.

According to an aspect of the invention, communication network 160 may host a service 150 that is accessible from the plurality of computers 100a-100e. The service 150 gathers information and tracks users of computers 100a-100e to provide computing services for all of the users of the service.

Figure 2:
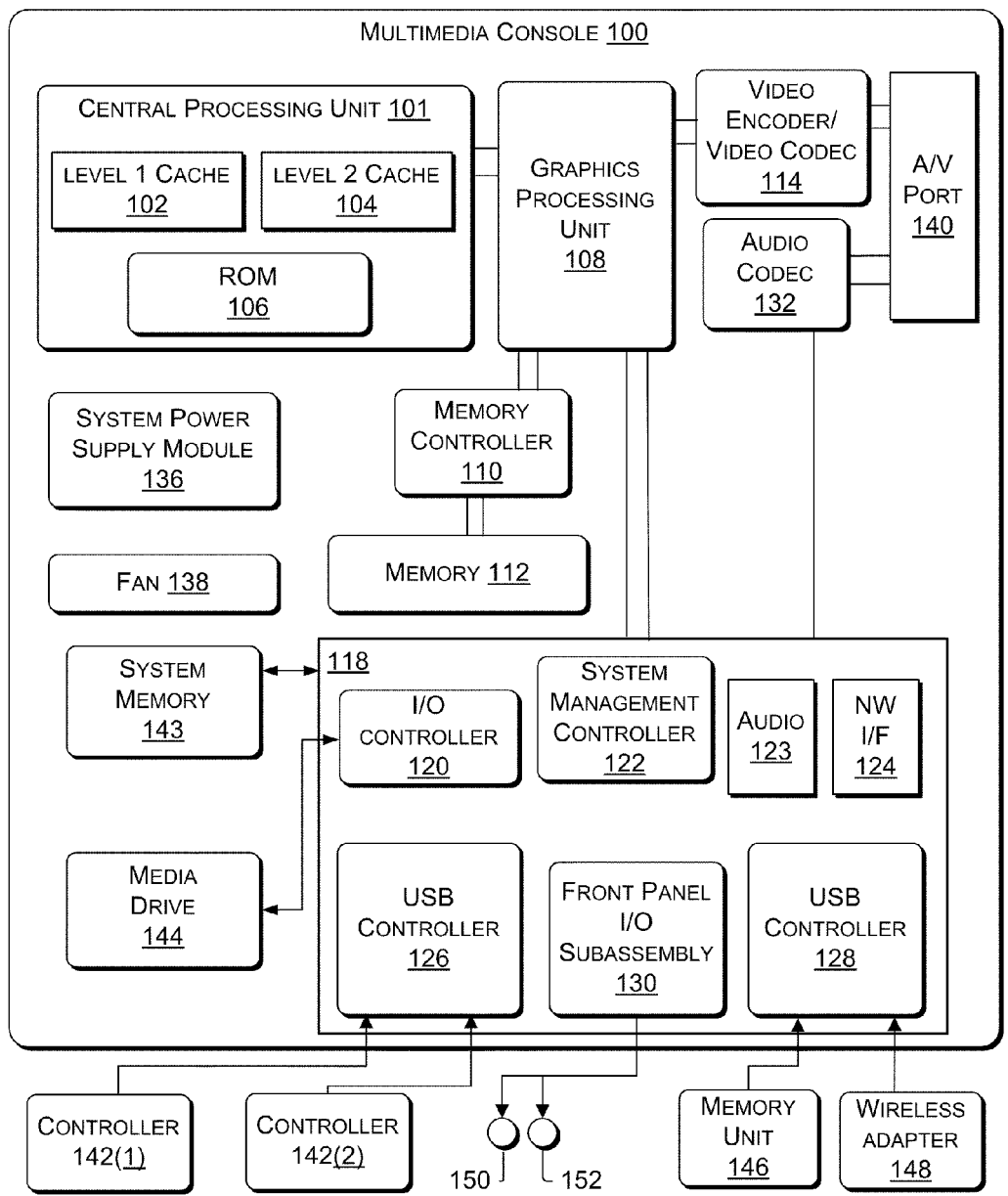
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of the invention, when a game is executed on console 100, it provides information to a service operating on communications network 160. The service tracks the information for all of the users connected to the service to provide a rich user experience. The service tracks user information across games, consoles, computing devices, etc. By tracking the information for all users of the service, the service can aggregate statistics for all users and measure game playing ability, provide a richer user experience by providing information about friends (e.g., what game they are playing and what skill level they have attained), track user achievements and generally measure statistics for a game aggregated over a large user community.

For each user, the service will collect a number of pieces of data (called Profile Data) to build the user profile in every game session—and even after a game session is concluded. In general, the pieces of the service experience that feed profile include:

1. What the user says about himself or herself (including account set up and the construction of an elaborate personal profile, including the preferred social gameplay "zone").
2. What others say about the user (feedback scores that feed a publicly visible reputation).
3. What the games say about the user (game configuration and integration of data that comes out of game play to compute a player's skill, among other things).
4. What the system says about the user (time online, aggregates of games played, Friends list, console behavior etc.)

The system creates a "User Profile," which serves as a building block for services and applications that aim to create a social community of gamers and grow relationships among players. The User Profile is the entirety of information (e.g., metadata) related to a specific user (i.e., the game player's digital identity). The User Profile is developed from a set of services that collect and expose this information in a meaningful way to the community. The User Profile also provides for personalization such that users can customize and enhance their gaming experience. As will be discussed in greater detail below, the User Profile consists of various components, including, but not limited to, a Gamercard, game achievements, and gamer preferences.

Figure 3:
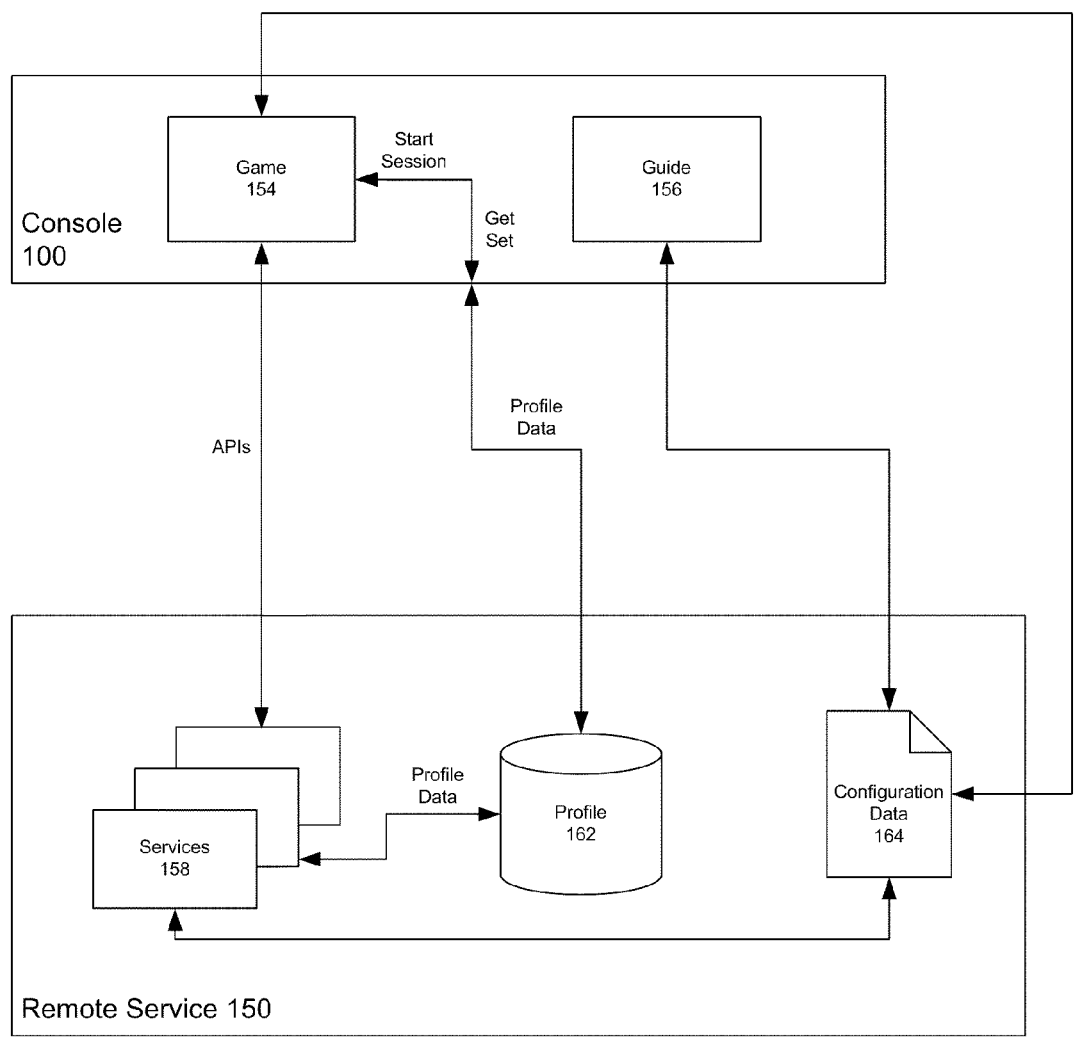
FIG. 3 is a block diagram illustrating the interaction of a console with the remote service.

Referring to FIG. 3, there is illustrated an overview of an exemplary architecture that may be used to implement the User Profile interaction as well as user interaction with the matchmaking service described more fully herein. The console 100 interacts with a remote service 150 that provides services 158 such as voice/chat, a friends list, matchmaking, content download, roaming, feedback, tournaments, voice messaging, and updates to gamers. The service 150 also maintains the User Profiles in a profile database 162 and configuration data 164 used by the services 158 and games 154. The service 150 collects User Profiles, aggregates, processes information supplied by other services 158, and fulfills real-time client requests for retrieving User Profile-related services. The User Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. When requesting User Profile information, the game 154 may pass a unique identifier of a user. The service 150 may return a Gamercard (discussed below), game stats, game achievements, affiliations, game settings. etc. Additional details of the various aspects of the exemplary architecture are provided below.

Figure 4:
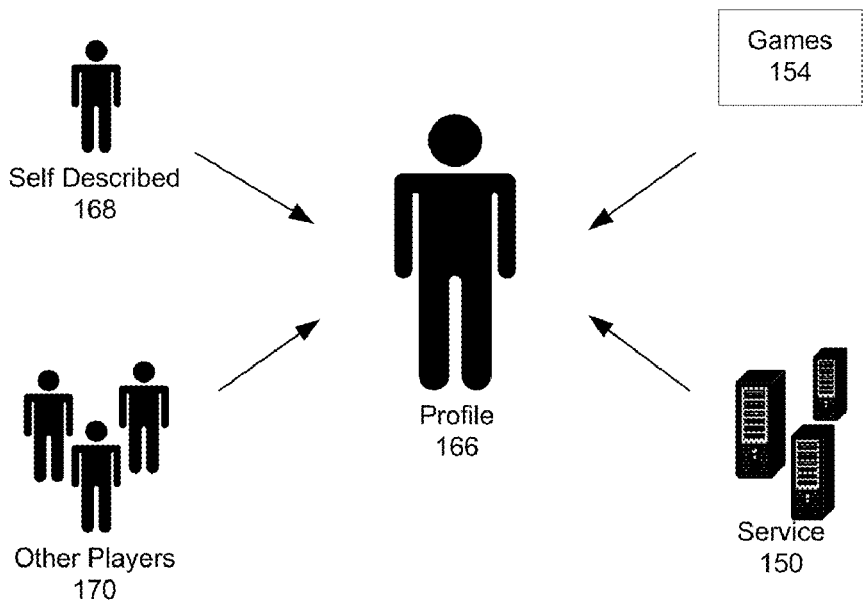
FIG. 4 illustrates the information gathered to build a user profile.

Referring to FIG. 4, the User Profile 166 is created when a user creates a profile (selected from the guide 156) and chooses his/her unique Gamertag (a user's unique name), tile (picture/avatar associated with the user) other options during an account sign-up phase. From there, a base User Profile 166 is created. The User Profile 166 may then be populated from several sources. For example, the User Profile 166 may include self-described data 168 from the User Profile owner. Other gamers 170 can provide feedback regarding the User Profile owner. The service 150 may track the user's online and offline activity. In addition, the games 154 may report the user's statistics and game achievements.

The owner of User Profile 166 can edit his/her User Profile 166 directly and control who can view each section of the User Profile. The User Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the User Profile 166 to, e.g., restrict presence information only to friends, allow game achievements to be visible to all, etc.

The User Profile 166 may include feedback provided by other players 170. Feedback helps others learn about a particular gamer. For example, if the gamer uses foul language or aggressive play in game sessions, other gamers may submit feedback to the service 150. The feedback mechanism improves the user experience by building reputations. Players are therefore anonymous (known only by "Gamertag"), but not unknown because of the accumulated feedback.

In another aspect of the system, the service 150 and games 154 track online and offline activity of users to provide usage statistics in the Gamer Profile 166. When a gamer plays online, a particular game title is added to list of games played that is made visible to others. While offline, the game console 100 and game 154 track the user's activity via a mechanism for instrumenting games to collect detailed information about a specific player's in-game statistics and accomplishments. The Gamer Profile 166 is updated during the next connection to the service 150 to reflect the offline play. Game achievements may be reported to the service 154 by games via the User Profile data mechanism.

Referring to FIGS. 5-8, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166.

Figure 5:
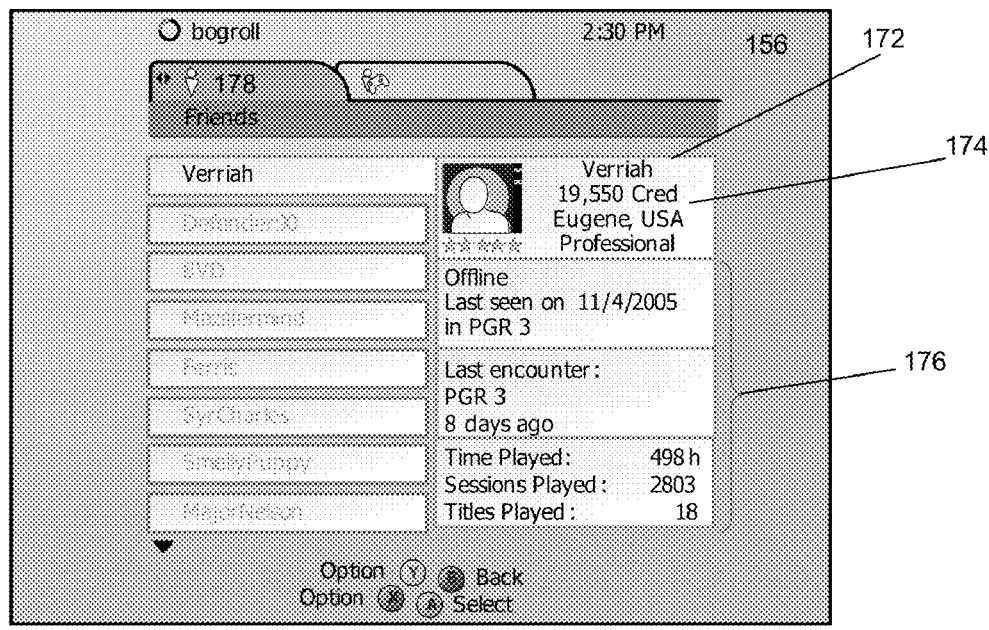
FIG. 5-7 are example illustrations of a user interface displaying user profile information.

As shown in FIG. 5, the Gamercard 172 may be divided into two regions, a base area 174 and a context-specific (or extended) area 176. The base area 174 is provides a set of Gamer Profile information in a standard and consistent way across multiple contexts, whereas the extended area 176 may be customized to fit a specific context. Although the Gamercard 172 of FIGS. 5-8 are shown in the context of the guide 156, the Gamercard 172 may be visually separated from the rest of the screen and adopt the background color of the screen it is displayed on. In addition, the Gamercard 172 may be temporarily replaced by an animation while it is being loaded for viewing.

The base area 174 may be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating/reputation, gamer Cred (a points-based reward points system), gamer zone, country, membership tier, awards, etc. An offline Gamercard 172 is shown when a player is looking at his/her own Gamercard 172. The offline base area 174 may include a subset of the online base area and may further include information regarding titles played and time played. The base area 174 of a Gamercard 172 is preferably fixed in size, has a consistent, static layout and has a fixed placement of all information elements, such as Tile or Gamer Cred.

Figure 6:
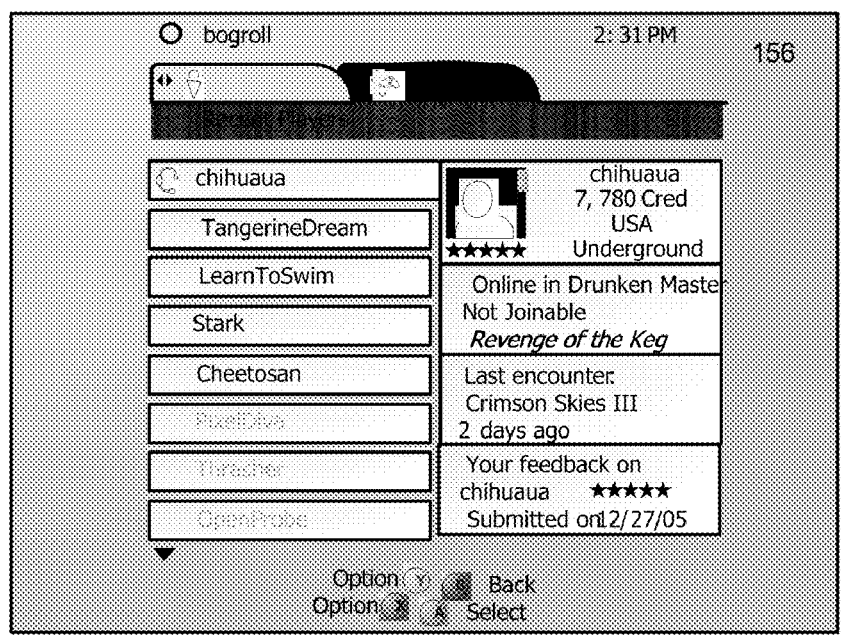
Figure 7:

The extended area 176 may include a set of Gamercard Actions, such as "View Profile" and "Send Feedback," etc. The extended area of the Gamercards is preferably not fixed in size, because it may vary based on the context. As shown in FIGS. 5-7 a user may scroll through the list of other users via the guide 156 and a friends list 178. The Gamercard for other users may be displayed as the user scrolls among his/her friends or the user may be presented with an option to see a full view of the Gamer Profile. The full view mode consists of different views of the extended area 176 and may include several sections, such as a Profile Summary, Community Feedback, Game Achievements, Activity, and Social Network. The guide 156 may advance through the list of friends, recent players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Matchmaking and Session: For online, multi-player games, Matchmaking connects a game player to a session. A Match made session is an instance of game play that includes two (2) or more gamers playing a game until they either decide to terminate the session or until the session meets its end criteria (as defined by the game). The person who creates the session is the host. Some games are hostless, meaning that the game does not assign any special function to the person who originated the game. In such a case, the originator may, in fact, be a person who was searching for a session with specific criteria and, when it was not found, the game created a session for the person and advertised it for others to match into it. Matchmaking involves joining a session that has, as a minimum, one player already in place. A session is said to be joinable if there are open slots available to the person seeking a slot and the game play has not yet begun (the game is in "lobby" state). Some games that have join in progress sessions will advertise that a session is joinable until every public slot is filled. A gamer makes a Match by selecting "Matchmaking" in a game or in an out-of-game Matchmaking system. The Matchmaking UI may allow a gamer to add some filters to his search for a session (e.g. like specifying a map or difficulty level), or it may push a gamer directly into a search query. In most cases, with or without filters, a gamer is given a session search result which consists of a list of sessions. In the case of a search result, a gamer then selects a session and joins it. Typically, a player then enters a lobby and awaits other players to match into the game before game play begins. In some cases, no search result is shown, and players are dropped instead directly in the lobby of the game that best meets their search criteria.

Social Matchmaking with the Affiliates List: When a game player chooses to Matchmake into a session, in the first session he plays, the profile data (including such things as the Gamer Zone and Cred) he has set describing himself is used to "prime the pump" and find the best fellow new gamers to play with. As he continues to play additional session, the game player associates with a group of fellow gamers who become "Recent Players" on the Affiliates List. The service preferably prioritizes playing with Recent Players over strangers in future session, but once a game player give positive feedback, these "positive feedback" people are remembered by the system and are given even higher priority in the Affiliates List. Over time, as a gamer becomes very familiar with a set of players, he invites them to become friends. These friend gainers are given the highest priority.

This Matchmaking system will connect people who have similar intent and who share a similar profile to insure that they all have a good time, in and out of game play (but primarily in game play). Matchmaking—with its use feedback and profile data—facilitates people expanding and refreshing their online community with increasingly refined matches over time. Ultimately, Matchmaking will bind people to the service as a safe, secure place to meet new people and create a history of positive experiences.

Details on Query-Based Social Matching on User Profile: Several of the aspects of User Profile that surface in a Gamer Card can be used to match a game player to a session. At a high level, according to an aspect of the invention when a game player signs up in the service 150, he is asked to select a Gamer Zone that best describes the kind of social environment he prefers to play in. Before the service has other profile data to use, this Gamer Zone is used to match the game player with other players who have selected the same Zone. This match is done by a simple database query looking for Social sessions that contain a majority of players with this same Zone.

As time goes on and the service has additional data about each player, this Match query can be improved by averaging multiple key aspects of User Profile (still the Zone, but as time goes on, also Feedback Reputation, skill computed via stats, and his experience defined by Achievements achieved) for each participant in a session. The system then can provide a session "profile" that can be compared with the User Profile of a player seeking a match. The match system can then query this session profile by comparing it to the values in a User Profile of an individual who wishes to join the session. If the match of the User Profile is sufficiently close to the session profile values (sharing the same Zone and within a pre-specified range for each of the numeric values for reputation, skill, and experience), then the user will be shown that session as a Match. If the match comparison is not within the pre-specified ranges, then the user's query will continue on to compare to other sessions' session profiles until a positive result is achieved. NAT type, physical proximity to other players, time played on the system, games played, etc. all are folded in on the back end when a Match search is performed.

Details on Social Matchmaking by Network of Affiliates: In addition to Matchmaking based on a query with User Profile, the Social Matchmaking system, in conjunction with the tracking of friends, recent players, and feedback on recent players, builds a network of Affiliates who are prioritized for Match.

The Affiliates list is a prioritized list of people for a player, stored in the online service and also cached locally, that includes (1) Friends (i.e. people who the player has invited, and who have accepted the invitation, to a preferred social network that allows exchange of messages and state information), (2) Positive Feedback people (i.e. people about whom the player has given positive feedback), and (3) Recent Players. The Social Matchmaking service always looks first (before conducting the query above) for the presence of Affiliate sessions on the service. If any person on a player's Affiliates list is online and in a joinable session, the service will return that session. If there are multiple Affiliate sessions, the ones with Friends are given priority over those with Positive Feedback People or those with Recent Players. Positive Feedback People are given priority over Recent Players. Additionally, sessions that contain users about whom the person has given negative feedback are given the lowest priority.

In accordance with the above, FIG. 6 illustrates a list of Recent Players in the guide 156. A person is added to a player's Recent Players list when the player has played an online game session with the person. The Gamercard displayed when browsing recent players shows the base area and an extended area that provides information regarding recent games, feedback, and presence of the recent players. FIGS. 7 illustrate further details that may be obtained about recent players, such as general achievements.

Details on Submitting Feedback to Generate Affiliates List and Reputation: Importantly, FIGS. 8 and 8A-8H illustrates a user interface for the feedback mechanism whereby a game player can provide feedback on other game players. Preferably, this feedback options should only be available on a Gamer Card when the viewing player has played with the person before. This feedback information is then used to improve matchmaking results, i.e., indicates whether or not you would want to play with this game player in future games. By giving positive feedback on a game player, that person moves up in priority in that feedback provider's Affiliates list, as described above. Moreover, the feedback affects the reputation of the game player receiving the feedback and may change the group of players with whom the player is group in future games.

Such a system allows the community police itself as much as possible while still offering a path to tell the service about serious "bad actors." The system separates out two paths: (1) peer-to-peer feedback ("Player Reviews") and complaints to the service and (2) gamer tools to tell each other reasons why they don't like playing each other.

An aspect of the invention leverages the feedback system to improve Matchmaking and to build an affiliates list. Preferably the system tracks peer-to-peer feedback and allow a player to give feedback on another player only one time (when they play online together). Preferably, a positive Player Review adds a gamer to the Affiliates list; whereas a negative Player Review adds a gamer to an Affiliates "black list."

Feedback is, then, for the purposes of Matchmaking, the creation of a "one-way" friends list, i.e., a low threshold mechanism to build a list of people you meet again and again. This mechanism is generally transparent except as an improved matchmaking experience. For example, when a game player indicates that he would like to play with a particular game player again, the system tracks that information in a one-way friends list so that the other player doesn't have to be invited or accept an invitation to be on a friends list. Moreover, the other player may not even know his or her status vis-à-vis the player providing the feedback.

If a player gives negative feedback on a player, that player moves to an "Avoid" category on the Affiliates List, and for the purposes of Social Matchmaking, all future sessions containing that person will be avoided for the player. The player who received the negative feedback is given a hidden list of players he should avoid so that his session results won't contain players who have chosen to avoid him.

Turning to FIG. 8, when a player has joined a game with another player, the service determines that the two players have come together in a session and offers the player the opportunity to provide feedback on the other player from the game (step 80). FIG. 8A illustrates a UI wherein the user is offered the opportunity to select a feedback button to provide feedback on the other player. The user is offered the opportunity to select the Player Review button 803 or the File Complaints button 804. If the complaint button is selected then the UI illustrated by card 820 is provided.

Figure 8B:
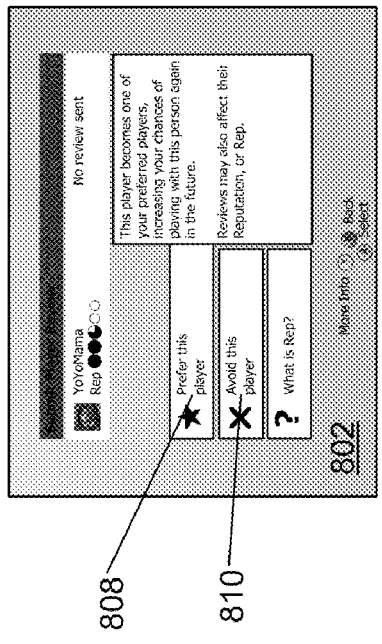
FIGS. 8A-D illustrate an example user interface for providing feedback on game players.
Figure 8D:
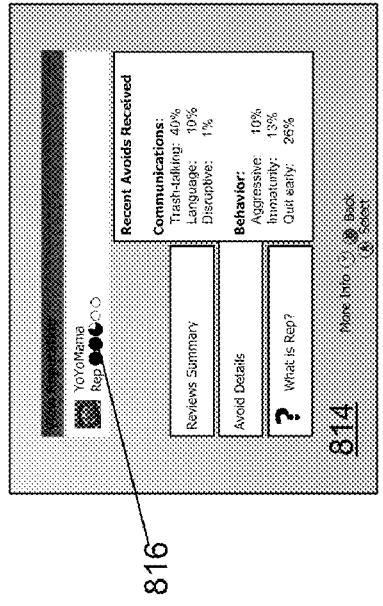
Figure 8A:
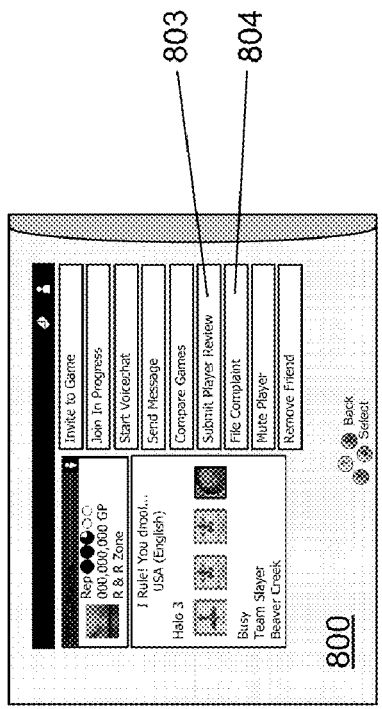

A determination is made whether this is the first time that this player has received feedback (step 81). If so, the service sets up all of the appropriate initializations for that player to receive feedback. If not, it is determined whether feedback can be given for this player, e.g., by determining whether feedback has previously been provided by the same other player or whether they have ever played together (step 82). If the player can receive feedback (i.e. if he has played with the other player), then the service records whether the feedback is positive or negative (whether the feedback provider chooses to increase their chances of playing with the other player or decrease them) (step 83). If the player has submitted feedback on the second player before, the player has is provided the opportunity to change the previous entry. As illustrated in FIG. 8B, the player is given a choice to Prefer a player (increase the chances of playing with them again) or to Avoid the player (decrease chances). If Prefer is selected (button 808), then the player is added to the feedback providers affiliates list, positive feedback is recorded and the feedback is complete. The feedback is aggregated as part of the player's overall feedback score/reputation.

Figure 8C:
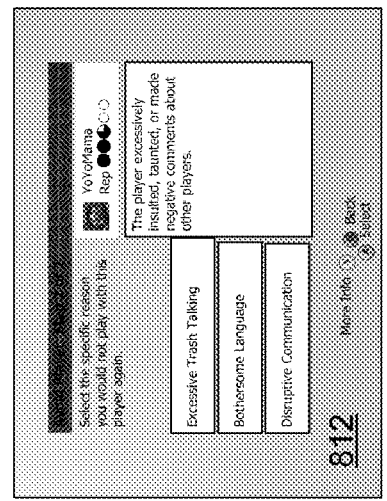

If Avoid (button 810) is selected, then the feedback provider is requested to select a feedback category and a specific reason (e.g., the player showed immature behavior under the Game Behavior category, was too good under the player skill category, used disruptive voice under the communication category, and so on) (step 84). FIG. 8C provides an illustrative UI that shows a set of reasons in a specific category that may be presented from which a feedback provider may select. FIG.

8D illustrates how the feedback is aggregated into a player's reputation 816. Here, player YoyoMama's accumulated negative feedback is shown.

Figure 8E:
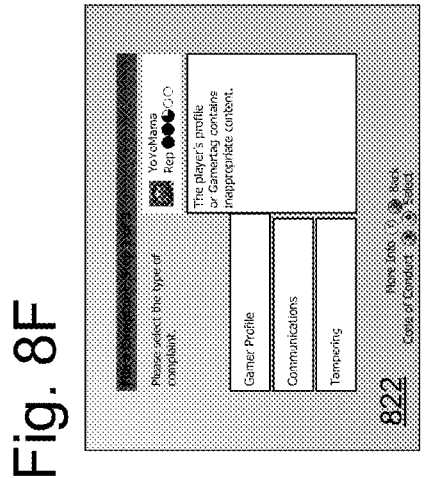
FIGS. 8E-H illustrate an example user interface for filing complaints about other game players.
Figure 8F:
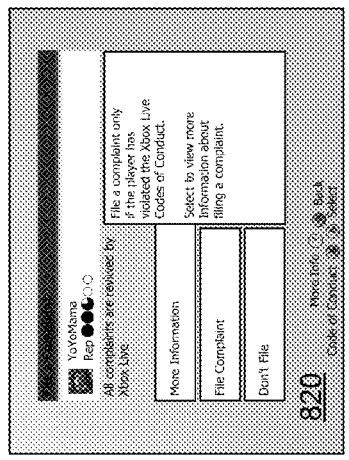
Figure 8G:
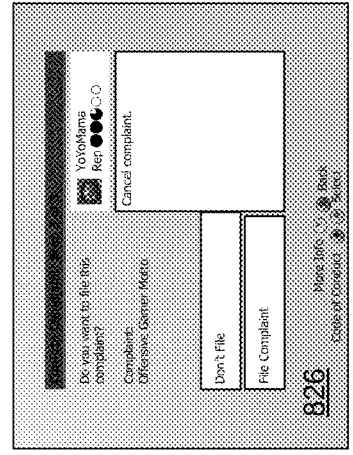
Figure 8H:
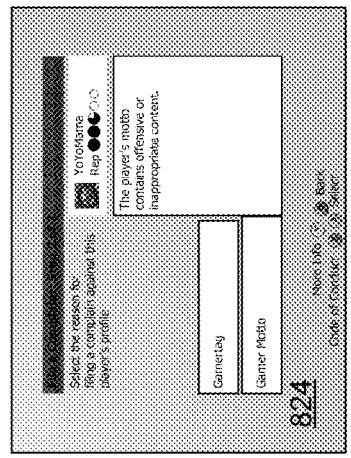

Thereafter, the feedback is recorded and the feedback provider is offered the opportunity to also file a complaint (step 85). FIGS. 8E-H further illustrate the complaint types 86 as shown by the feedback UI. In FIG. 8E, the feedback provider has selected the complaint button 804 and proceeded directly to filing a complaint by way of screen 820. In FIG. 8F, the feedback provider is asked to select a category of complaint to be filed as shown in screen 822. The feedback provider is asked to provide a specific reason for the complaint. FIG. 8G illustrates specific reason option topics for filing a complaint in screen 824. Finally in the screen 826 of FIG. 8H, the confirmation of the complaint filing is provided. This complaint system, which focuses on code-of-conduct violations, is separated from the feedback system (which focuses on game play). Any number of complaints may be filed by one player on another because of legal policy requirements. Feedback, however, focuses on building social networks.

Calculating Reputation: A player's reputation consists of an aggregation of that player's positive and negative feedback. That aggregation considers all of the following equation:

$$\frac{U - (CN * N) + (CP * P)}{U}$$

Values in the equation:

CN=Tunable constant to determine the importance of negative feedback to a reputation CP=Tunable constant to determine the importance of positive feedback to a reputation U=Total number of unique players the person has played with T=Trust rating, computed by determining the number of times a player gives feedback similar to other people in a session.

t=Time decay factor constant

N=Negative feedback value, (N1*t+T1 through TN), where T1 through TN are the trust ratings of each person who has given negative feedback in the most recent session, and N1 equals the Negative feedback value prior to the most recent session.

P=Positive feedback value, (P1*t+T1 through TN), where T1 through TN are the trust ratings of each person who has given positive feedback in the most recent session, and P1 equals the Positive feedback value prior to the most recent session.

Figure 9:
FIGS. 9-12 illustrates a user interface whereby a user can initiate a matchmaking.
Figure 10:
Figure 11:
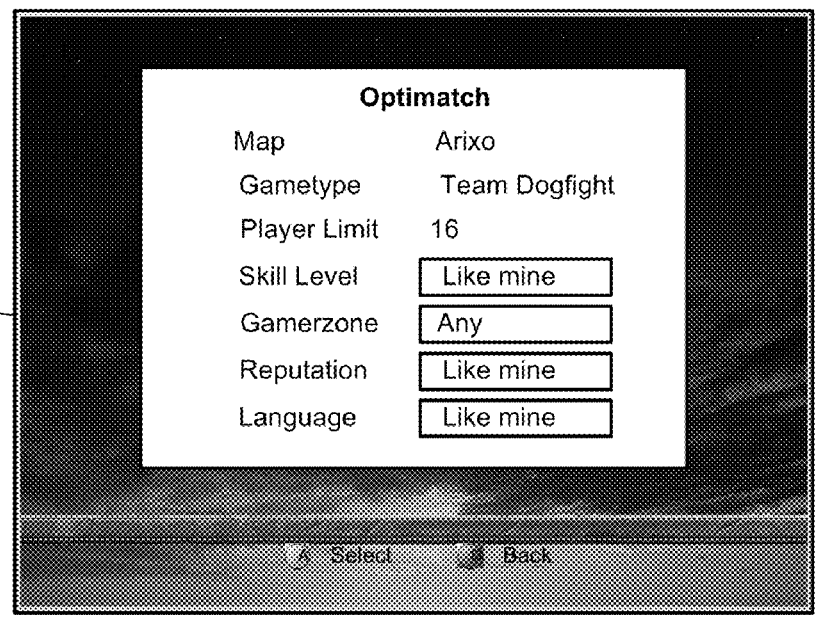
Figure 12:

Social Matchmaking Interface: FIG. 9 illustrates a user interface 1310 whereby a user can select the type of interaction desired for a particular game. Here for example, the user has selected from within the crimson skies game that he wants to play a skill match with game player of equal or higher skill level. This is not a Social Match. FIG. 10 illustrates a similar user interface 1310 wherein the user has selected the option of playing a Social Match. Additionally, the user has the option of selecting an Optimatch wherein the user selects the specific game criteria or options to use in the selection process. As shown in FIG. 11, when a user selects Optimatch he can specify whether or not he wishes the service to take into account his skill level, gamer zone (e.g., competitive or social), reputation, or language when conducting the Match. This feature allows the player to optimize the Social search criteria according to personal preference. A player may not, however, specify that he wishes to search for sessions skewed far from his own settings. In the case of reputation, for example, it may not be desirable to let a low reputation player single-out high reputation people to play with. FIG. 12 illustrates three matches that meet the criteria specified by the user (a similar display would be presented for any one of the above selected match options). The icons with the x4, x8, x2 next to them represent the number of Affiliates in each session.

Figure 13:
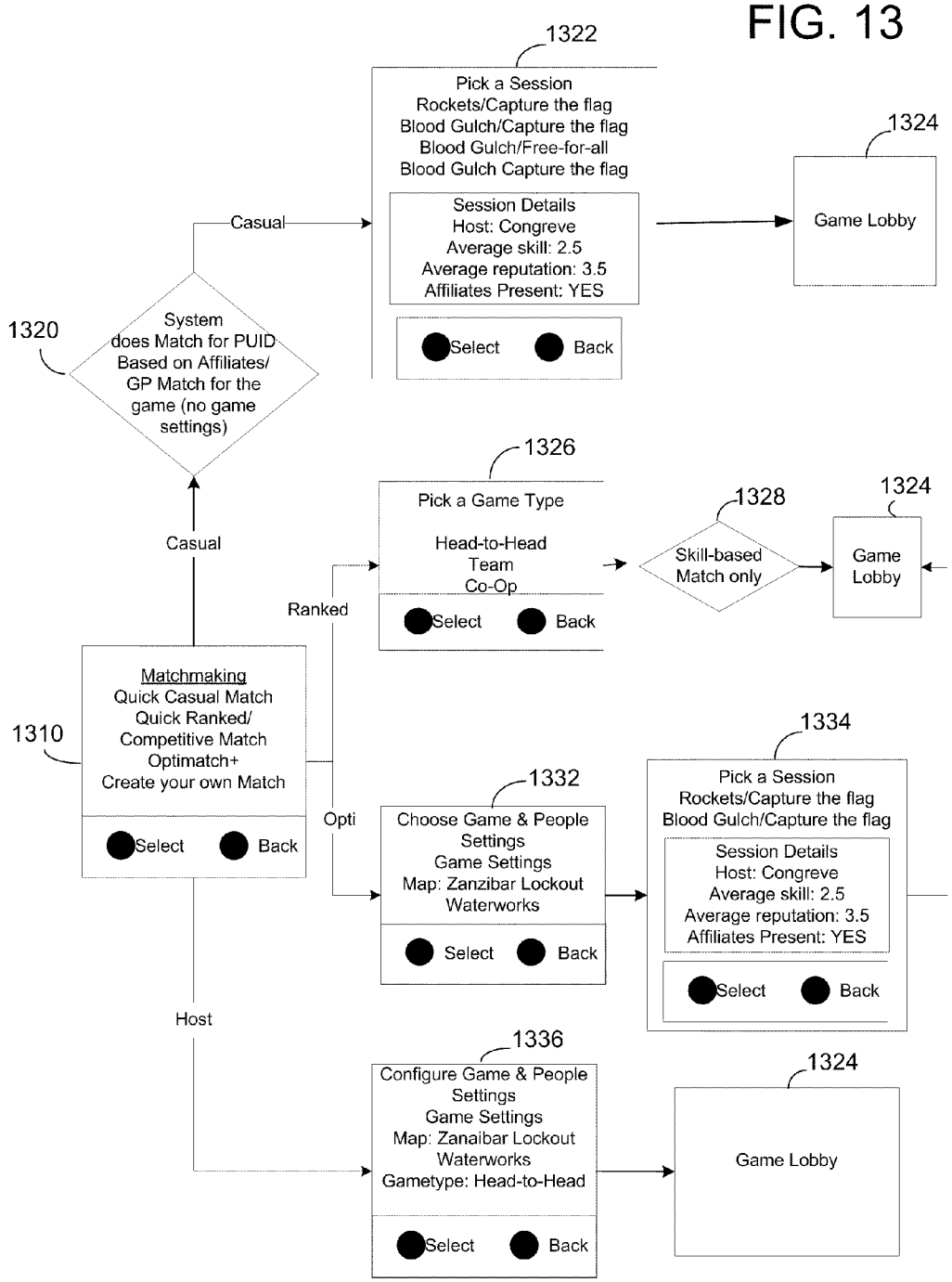
FIG. 13 illustrates a flow chart of the matchmaking options.

FIG. 13 provides an overall flow chart that illustrates the flow of the UI options for matching that are selectable by a player. Initially, at screen 1310 (which parallels the image show in FIGS. 9 and 10), the user is presented with a variety of matchmaking options. The player could simply select the option of playing a "casual" social game and letting the system provide the matching set of game players at step 1320 and as described above. In that instance, a set of user would be selected based on affiliates, most recently played, etc. Thereafter, the user would be presented with a screen 1322 containing a variety of session that matched. After the user selects one of the sessions, he would go to lobby 1324 and wait for the game session to be started.

Similarly, at screen 1310, the player could select a ranked or skill-based game and move to screen 1326. At that screen, the player would then select whether the game should be head-to-head, team, etc. That would preferably allow only skill based players at step 1328 to enter the lobby 1324 to wait for the game session to be started. Alternatively, the player could select the option matching from the main screen 1310 and go to screen 1332 to enter match options. Thereafter, a set of matching game session would be presented at screen 1334 from which the player could select and again go to lobby 1324.

Additionally, the player could, instead of joining a session created by another user, elect to host a game session by specifying the criteria for joining the session as indicated by screen 1336. Thereafter, the player would wait in the lobby for other players that joined the game session, e.g., by selecting the proper criteria from the matchmaking system.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A system for playing a multi-player computer-based game, comprising:
 a computing device comprising a processor;
 a memory in communication with said computing device when the system is operational, said memory having stored thereon computer readable instructions that upon execution by the processor cause the operation of:
 accessing a database having a plurality of user profiles, said user profiles comprising a plurality of attributes of a plurality of users, the user profiles being developed from a set of services;
 providing a service configured for receiving input from a select one of said plurality of users, said input configured for providing feedback about the reputation of another of the plurality of users, said service configured for maintaining an aggregation of feedback for the another of the plurality of users, wherein an indication of said aggregation is readable by the other of the plurality of users and wherein providing feedback by a user causes a change in an affiliate list maintained for the user providing the feedback wherein the affiliate list stores relational information comprising an indication of others of the plurality of users with whom the user has established a relationship and an indication of others of the plurality of users about whom the user has given positive or negative feedback, wherein the indications of others of the plurality of users in the affiliate list are prioritized based on whether the user has an established relationship with the others of the plurality of users and whether the user has given positive or negative feedback about the others of the plurality of users; and providing a service that tracks a user's online and offline activity to provide usage statistics in the user profiles.

2. The system as recited in claim 1 wherein said service maintains said another of the plurality of users in an affiliate list for said select one of said plurality of users when the feedback is positive or negative.

3. The system as recited in claim 1 wherein the service is maintained on a server and wherein said plurality of users connect to the service over a network connection.

4. The system as recited in claim 3 wherein the plurality of users connect to the server by way of a game console.

5. The system as recited in claim 1 wherein the aggregation is aggregated over a plurality of different games.

6. The system as recited in claim 4 wherein said game consoles locally execute at least a portion of the multi-player game.

7. The system as recited in claim 1 wherein the indication of feedback comprises at least one of an indication of the number of other ones of the plurality of users who provided positive feedback and the number of other ones of the plurality of users who provided negative feedback.

8. A method for playing a multi-player computer-based game, comprising:

providing on a computing device a database having a plurality of user profiles, said user profiles comprising a plurality of attributes of a plurality of users;

receiving on a computing device input from a select one of said plurality of users, said input providing feedback about the reputation of another of the plurality of users; and maintaining in said database an aggregation of feedback for the another of the plurality of users, wherein an indication of said aggregation is readable by the other of the plurality of users, wherein the feedback for a user causes a change in an affiliate list maintained for the select one of said plurality of users providing the feedback wherein the affiliate list stores relational information comprising an indication of other users with whom the user has established a relationship and an indication of other users about whom the user has given positive or negative feedback, wherein the indications of others of the plurality of users in the affiliate list are prioritized based on whether the user has an established relationship with the others of the plurality of users and whether the user has given positive or negative feedback about the others of the plurality of users.

9. The method as recited in claim 8 comprising maintaining said another of the plurality of users in an affiliate list for said select one of said plurality of users when the feedback is positive.

10. The method as recited in claim 8 wherein the database is maintained on a server.

11. The method as recited in claim 9 wherein the plurality of users connect to the server by way of a game console.

12. The method as recited in claim 8 wherein the aggregation is aggregated over a plurality of different games.

13. The method as recited in claim 11 wherein said game consoles locally execute at least a portion of the multi-player game.

14. The method as recited in claim 8 wherein the indication of feedback comprises at least one of an indication of the number of other ones of the plurality of users who provided positive feedback and the number of other ones of the plurality of users who provided negative feedback.

15. A computer-readable memory device bearing computer-readable instructions for playing a multi-player computer-based game, comprising:

computer-readable instructions for accessing a database having a plurality of user profiles, said user profiles comprising a plurality of attributes of a plurality of users;

computer-readable instructions for receiving input from a select one of said plurality of users, said input providing feedback about the reputation of another of the plurality of users; and computer-readable instructions for storing in said database an aggregation of feedback for the another of the plurality of users, wherein an indication of said aggregation is readable by the other of the plurality of users, and wherein providing feedback for a user causes a change in an affiliate list maintained for the user providing the feedback wherein the affiliate list stores relational information comprising an indication of other users with whom the user has established a relationship and an indication of other users about whom the user has given positive or negative feedback, wherein the indications of others of the plurality of users in the affiliate list are prioritized based on whether the user has an established relationship with the others of the plurality of users and whether the user has given positive or negative feedback about the others of the plurality of users.

16. The computer-readable memory device as recited in claim 15 comprising computer-readable instructions for adding said another of the plurality of users to an affiliate list for said select one of said plurality of users when the feedback is positive.

17. The computer-readable memory device as recited in claim 15 comprising computer-readable instructions for accepting a connection from said plurality of users over a network connection.

18. The computer-readable memory device as recited in claim 16 comprising computer-readable instruction for accepting a connection from the plurality of users by way of a game console.

19. The computer-readable memory device as recited in claim 18 wherein each of said game console locally executes at least a portion of the multi-player game.

20. The computer-readable memory device as recited in claim 15 wherein the indication of feedback comprises at least one of an indication of the number of other ones of the plurality of users who provided positive feedback and the number of other ones of the plurality of users who provided negative feedback.

* * * * *